United States Patent
Aoki et al.

(10) Patent No.: US 9,165,581 B2
(45) Date of Patent: Oct. 20, 2015

(54) THERMALLY ASSISTED MAGNETIC RECORDING HEAD WITH MAIN MAGNETIC POLE APART FROM NEAR FIELD LIGHT GENERATOR

(71) Applicant: TDK Corporation, Tokyo (JP)

(72) Inventors: Susumu Aoki, Tokyo (JP); Takafumi Kobayashi, Tokyo (JP); Kei Hirata, Tokyo (JP); Eiji Komura, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 58 days.

(21) Appl. No.: 14/204,064

(22) Filed: Mar. 11, 2014

(65) Prior Publication Data

US 2015/0262595 A1    Sep. 17, 2015

(51) Int. Cl.
  G11B 5/187 (2006.01)
  G11B 5/31 (2006.01)
  G11B 5/48 (2006.01)
  G11B 5/60 (2006.01)
  G11B 5/11 (2006.01)
  G11B 5/127 (2006.01)
  G11B 5/00 (2006.01)

(52) U.S. Cl.
  CPC ............... G11B 5/4866 (2013.01); G11B 5/11 (2013.01); G11B 5/1278 (2013.01); G11B 5/314 (2013.01); G11B 5/6082 (2013.01); G11B 2005/0021 (2013.01); G11B 2005/0024 (2013.01)

(58) Field of Classification Search
  CPC .... G11B 5/1278; G11B 5/3133; G11B 5/314; G11B 5/3146; G11B 2005/0024
  USPC ............... 360/125.3, 125.31, 125.03, 125.05, 360/125.06, 125.16, 125.18, 125.34, 360/125.35, 125.36
  See application file for complete search history.

(56) References Cited

U.S. PATENT DOCUMENTS

| 8,351,151 B2 * | 1/2013 | Katine et al. ................... 360/110 |
| 8,456,969 B1 | 6/2013 | Mooney et al. |
| 8,947,985 B1 * | 2/2015 | Morelli et al. ............. 369/13.33 |
| 8,988,826 B2 * | 3/2015 | Sugiyama et al. ....... 360/125.31 |
| 8,988,827 B1 * | 3/2015 | Balamane et al. ....... 360/125.31 |
| 2010/0103553 A1 | 4/2010 | Shimazawa et al. |
| 2013/0170332 A1 | 7/2013 | Gao et al. |
| 2013/0258825 A1 | 10/2013 | Seigler et al. |
| 2015/0071044 A1 * | 3/2015 | Sasaki et al. ............... 369/13.17 |

OTHER PUBLICATIONS

Simon Greaves et al., Split-Pole Write Head for Thermally Assisted Magnetic Recording, IEEE Transactions on Magnetics, vol. 47, No. 10, Oct. 2011, p. 2375-2378.

* cited by examiner

Primary Examiner — Jefferson Evans
(74) Attorney, Agent, or Firm — Posz Law Group, PLC

(57) ABSTRACT

A thermally assisted magnetic recording head has a generator end surface facing an air bearing surface (ABS), and includes: a near-field light (NF light) generator that generates an NF light on the generator end surface and irradiates a magnetic recording medium with the NF light, and a main magnetic pole end surface positioned in the vicinity of the generator end surface; a main magnetic pole that emits a magnetic flux from the main magnetic pole end surface to the magnetic recording medium and a shield end surface positioned in the vicinity of the generator end surface; and a return shield that is magnetically linked to the main magnetic pole, and that absorbs the magnetic flux returning from the magnetic recording medium at the shield end surface. The main magnetic pole and the return shield are positioned to be on the same side with respect to the NF light generator in the down track direction, and the NF light generator does not overlap with the main magnetic pole either in the down track direction or in the cross track direction.

14 Claims, 5 Drawing Sheets

THERMALLY ASSISTED MAGNETIC RECORDING HEAD WITH MAIN MAGNETIC POLE APART FROM NEAR FIELD LIGHT GENERATOR

BACKGROUND OF THE INVENTION

1. Field of the Invention

The present invention relates to a thermally assisted magnetic recording head, and it particular relates to a magnetic circuit used for recording.

2. Description of the Related Art

Recently, in a magnetic recording device typified by a magnetic disk apparatus, in association with high recording density, there is a demand for improvement in performance of thin film magnetic heads and magnetic recording media. As the thin film magnetic head, composite-type thin film magnetic heads are widely used in which a reproducing head having a magneto-resistive effect element (MR element) for reading, and a recording head having an induction-type electromagnetic transducer element for writing, are laminated on a substrate.

The magnetic recording medium is a discontinuous medium where magnetic grains are aggregated, and each magnetic grain has a single magnetic domain structure. Each recording bit on the magnetic recording medium is configured by a plurality of magnetic grains. In order to increase the recording density, asperities at the border between adjacent recording bits need to be decreased by decreasing the size of the magnetic grains. On the other hand, decreasing the size of the magnetic grains, i.e., decreasing in the volume of the magnetic grains, results in a decrease in the thermal stability of magnetization in the magnetic grains. In order to resolve this problem, it is effective to increase the anisotropic energy of the magnetic grains. However, the increased anisotropic energy of the magnetic grains enhances the coercive force of the magnetic grains, making it difficult to record the information on an existing magnetic head.

As a method for resolving this problem, a so-called thermally assisted magnetic recording is proposed. In this method, a magnetic recording medium with a high coercive force can be used. At the time of recording information, the simultaneous addition of a magnetic field and heat to a portion of the recording medium where the information increases the temperature of that portion. This results in information being recorded by the magnetic field at the portion where the coercive force is decreased. Hereafter, the magnetic head used for thermally assisted magnetic recording is referred to as a thermally assisted magnetic recording head.

In thermally assisted magnetic recording, a near-field light (NF light) is used in general as a means for adding heat to the magnetic recording medium. The NF light is a type of electromagnetic field formed around the periphery of a material, and is not restricted by a diffraction limit due to light wavelength. As a result, it is possible to focus light onto a very small domain on the order of tens of nm.

A thermally assisted magnetic recording head using an NF light is described in US2010/0103553. A magnetic circuit that applies a magnetic field to a magnetic recording medium extends with a roughly U-shape within a plane that is orthogonal to an air bearing surface (ABS) of the magnetic head and the substrate, and a magnetic flux is emitted from the recording front end part that is one end of the U-shape, and the magnetic flux is absorbed from the other end. An NF light generator is positioned inside the U-shape within the plane, i.e. between both ends of the magnetic circuit when viewed in the down track direction (recording medium circumferential direction). In order to place the portion that is heated by the NF light on the magnetic recording medium and the portion where the magnetic flux is emitted as close as possible, the NF light generator is positioned close to the recording front end part in the down track direction.

Since the NF light generator is close to the recording front end part of the magnetic circuit, the light that is generated by the NF light generator is transmitted to the magnetic circuit, and the recording front end part is heated by this light. In order to enhance the magnetic flux density, a cross section that is orthogonal to the ABS of the recording front end part is generally small. Consequently, as the front end part is heated to a high temperature, it causes damages to itself, and to a dielectric body, such as $Al_2O_3$ and the like, covering the periphery of the magnetic circuit, abnormal deformation of the NF light generator and the generation of cracks. Further, the damage or omission of a protective layer made of diamond like carbon (DLC) and the like that protects the ABS occurs, which also causes a collision between the magnetic recording medium and the magnetic head.

The objective of the present invention is to provide a thermally assisted magnetic recording head that easily prevents heating of the recording front end part by heat from the NF light generator.

SUMMARY OF THE INVENTION

The thermally assisted magnetic recording head of the present invention has a generator end surface facing an air bearing surface (ABS); includes a near-field light (NF light) generator that generates NF light on the generator end surface and irradiates a magnetic recording medium with the NF light, and a main magnetic pole end surface positioned in the vicinity of the generator end surface; includes a main magnetic pole that emits a magnetic flux from the main magnetic pole end surface to the magnetic recording medium and a shield end surface positioned in the vicinity of the generator end surface; and has a return shield that is magnetically linked to the main magnetic pole, and that absorbs the magnetic flux returning from the magnetic recording medium at the shield end surface. The main magnetic pole and the return shield are positioned to be on the same side with respect to the NF light generator in the down track direction, and the NF light generator does not overlap with the main magnetic pole either in the down track direction or in the cross track direction.

Since the NF light generator does not overlap with the main magnetic pole either in the down track direction (recording medium circumferential direction) or the cross track direction (recording medium radial direction), it is easier to secure the distance between the main magnetic pole and the NF light generator. Therefore, it is difficult for the heat transfer to the main magnetic pole from the NF light generator to occur, and heating of the main magnetic pole is easily prevented. In the meantime, since the main magnetic pole and the return shield are positioned on the same side with respect to the NF light generator in the down track direction, and both the main magnetic pole end surface and the shield end surface are close to the generator end surface of the NF light generator, the generator end surface of the NF light generator can be arranged in the vicinity of a flow of the magnetic flux, which is emitted from the main magnetic pole end surface and is absorbed from the shield end surface. Therefore, a sufficient magnetic field can be applied to the magnetic recording medium, and it is easy to secure the recording performance.

According to another mode of the present invention, the thermally assisted magnetic recording head has a substrate; NF light generator that is positioned inside a first region surrounded by two planes extending parallel to an integrated surface of the substrate, and that generates an NF light and irradiates the magnetic recording medium with the NF light; a magnetic circuit that is positioned inside a second region surrounded by two planes extending parallel to the integrated surface of the substrate, which is away from the first region, and that circulates with the opened shape having two end surfaces, and where two end surfaces are opposite to each other in the cross track direction and are close to the NF light generator, and where one end surface emits a magnetic flux to the magnetic recording medium and the other end surface absorbs the magnetic flux returning from the magnetic recording medium; and a dielectric body that fills at least a part of the space between the two end surfaces. The NF light generator extends to the ABS via the space between projection to a substrate of the dielectric body in the down track direction and the dielectric body.

The above mentioned or other objective, characteristics and advantages will become clear from the following explanation by referring to the attached drawings where the present invention below is exemplified.

DETAILED DESCRIPTION OF THE INVENTION

Figure 1:
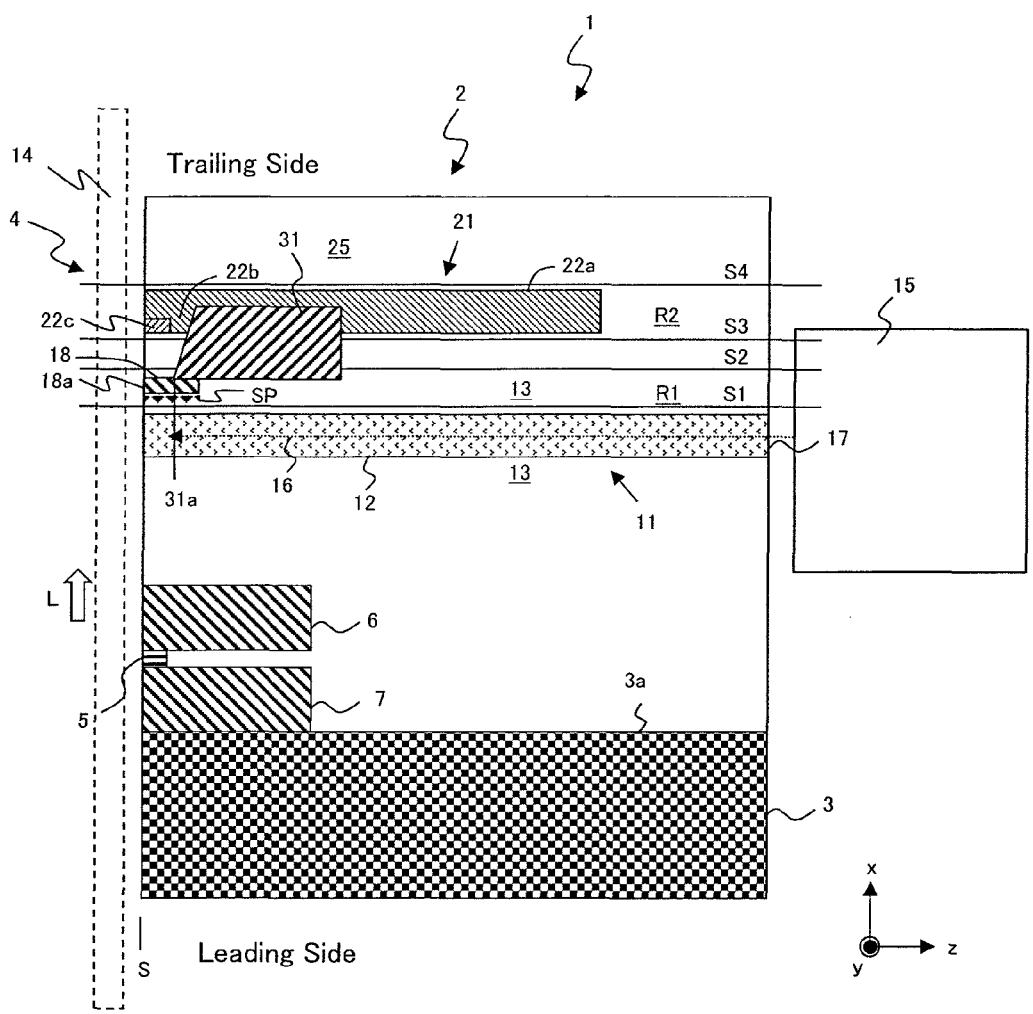
FIG. 1 is a conceptual cross-sectional view of a thermally assisted magnetic recording head relating to one embodiment of the present invention.
Figure 2:
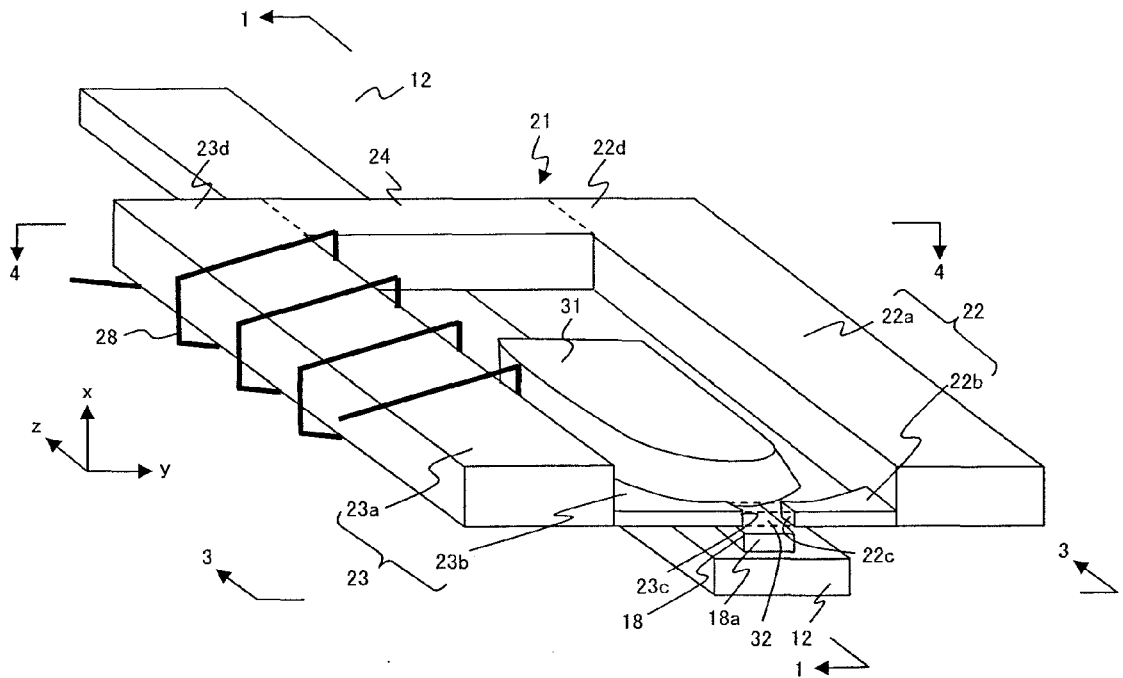
FIG. 2 is a main part perspective view of the thermally assisted magnetic recording head shown in FIG. 1.
Figure 3:
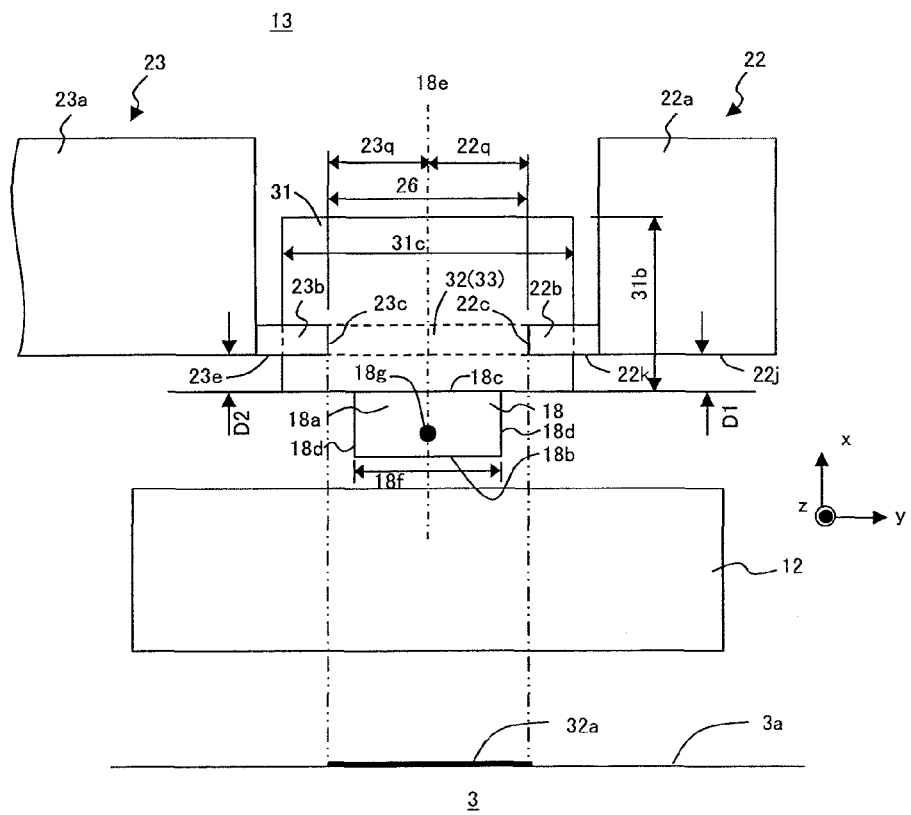
FIG. 3 is a main part side view at an air bearing surface (ABS) of the thermally assisted magnetic recording head shown in FIG. 1.
Figure 4:
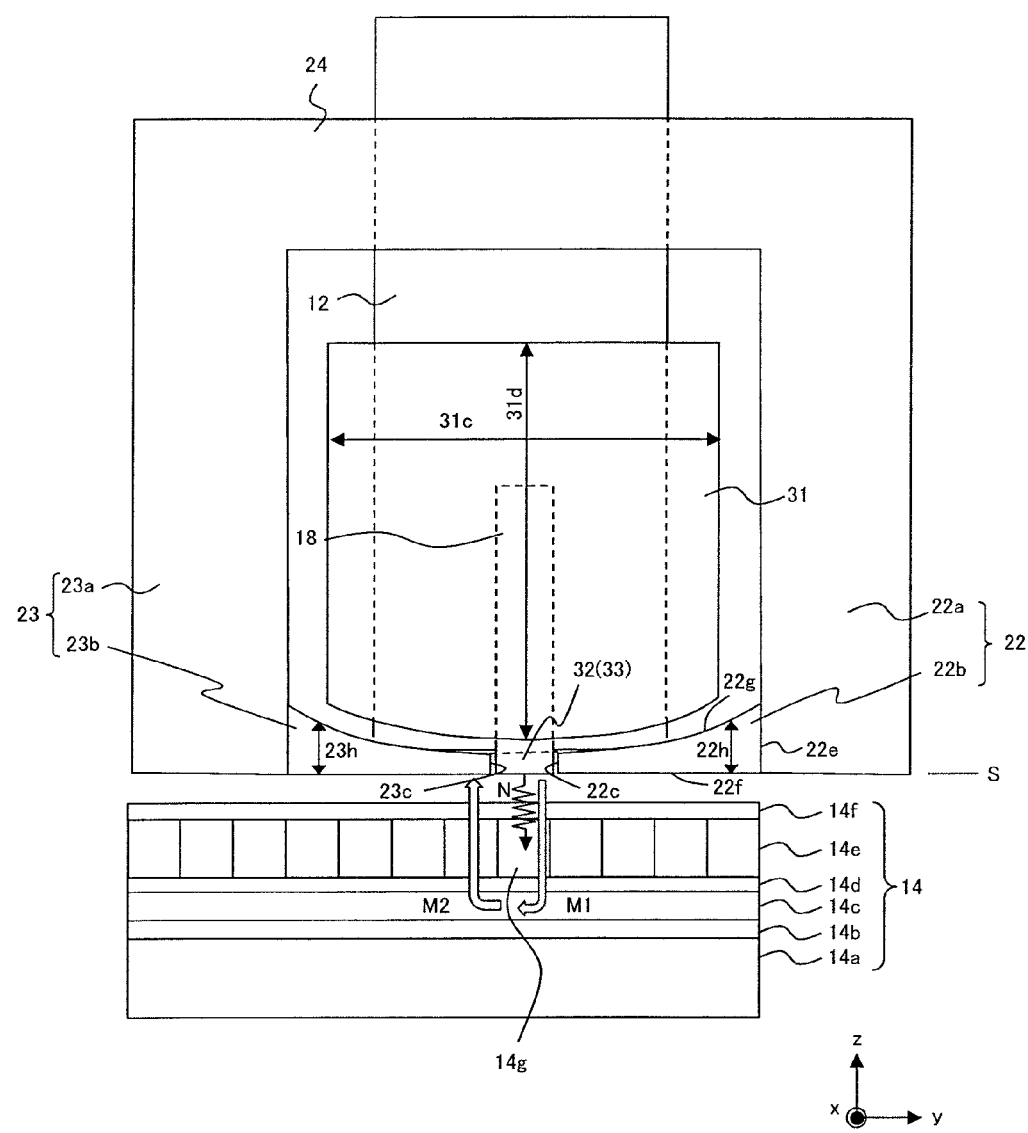
FIG. 4 is a main part plan view of the thermally assisted magnetic recording head shown in FIG. 1 viewed from the x direction.

The thermally assisted magnetic recording head of the present invention is explained with reference to the drawings. FIG. 1 is a conceptual cross-sectional view of the thermally assisted magnetic recording head along the line 1-1 of FIG. 2. FIG. 2 is a main part perspective view of a waveguide, a near-field light generator, a metal layer and a magnetic recording element; FIG. 3 is a main part side view of the waveguide, the NF light generator, the metal layer and the magnetic recording element at the ABS along the line 3-3 of FIG. 2; and FIG. 4 is a main part plan view of the waveguide, the NF light generator, the metal layer, the magnetic recording element and the magnetic recording medium along the line 4-4 of FIG. 2, viewed from the x direction.

In the specification, the x direction refers to the down track direction (recording medium circumferential direction) or a direction that is orthogonal to an integrated surface of a substrate where a magneto resistive (MR) element and a magnetic recording element are formed; the y direction refers to the cross track direction (recording medium radius direction) of the magnetic recording medium 14; and the z direction refers to the direction that is orthogonal to the ABS of a magnetic head slider. The x direction corresponds to the film formation direction L in the wafer process, the relative movement direction of the magnetic head slider with respect to the track circumferential direction of the magnetic recording medium, or a tangential direction of a track at a position of the thermally assisted magnetic recording head on the magnetic recording medium. The x direction, the y direction and the z direction are orthogonal to each other. "Upward" and "downward" correspond to a direction away from a substrate and a direction approaching to the substrate relative to the x direction, respectively. Instead of "upward", "trailing side" may be used, and instead of "downward", "leading side" may be used.

A thermally assisted magnetic recording head 1 has a magnetic head slider 2, and a laser light generator 15 that supplies laser light to a magnetic head slider 2. The magnetic head slider 2 has a substantially hexahedral shape, one plane of which forms an air bearing surface (ABS) S that is opposite to the magnetic recording medium 14. An MR element, a waveguide, an NF light generator, a magnetic recording element, explained below, and the like are formed above an integrated surface 3a of a substrate 3 (wafer) of the magnetic head slider 2. The substrate 3 is formed with AlTiC ($Al_2O_3$—TiC).

The magnetic head slider 2 has an MR element 5 where its front end part is positioned on the ABS S, an upper side shield layer 6 and a lower side shield layer 7 provided at both sides of the MR element 5 in the x direction, respectively. The MR element 5 may be any of a current-in-plane (CIP)—gigantic magneto resistive (GMR) element where a sense current flows in the y direction, a current-perpendicular-to-plane (CPP)—GMR element where a sense current flows in the x direction and a tunneling magneto resistive (TMR) element where a sense current flows in the x direction and utilizes a flow tunnel effect. When the MR element 5 is either the CPP-GMR element or the TMR element, the upper side shield layer 6 and the lower side shield layer 7 are also utilized as an electrode that supplies a sense current, respectively.

The magnetic head slider 2 has a waveguide 11 that can propagate laser light. The waveguide 11 has a core 12 extending in the z direction and a cladding 13 covering the core 12. The core 12 propagates laser light generated at a laser light generator 15 as a propagating light 16 in the z direction. The core 12 extends to the ABS S or its vicinity from an end part 17 (incidence part of laser light) that is opposite to the laser light generator 15 of the magnetic head slider 2. The core 12 may be terminated before the ABS S or may extend to the ABS S. A cross section of the core 12 that is orthogonal to the propagation direction (z direction) of the propagating light 16 is rectangular, and its width (dimension in the y direction) is greater than its thickness (dimension in the x direction). The core 12 may be formed from, for example TaOx. TaOx means tantalum oxide with any composition, and $Ta_2O_5$, TaO, $TaO_2$ and the like are typical, but it is not limited to these. The core 12 is covered with the cladding 13 with a smaller refractive index than the core 12. The cladding 13 can be formed with a dielectric body, such as $SiO_2$ or $Al_2O_3$.

The magnetic head slider 2 has a NF light generator 18 that generates NF light on the ABS S from the propagating light 16. The NF light generator 18 is positioned within a first region R1 surrounded by two planes S1 and S2 extending parallel to the integrated surface 3a of the substrate 3. The NF light generator 18 includes a generator end surface 18a which faces the ABS S and extends to the generator end surface 18a along the core 12 while being opposite to a portion of the core 12. The NF light generator 18 generates NF light on the generator end surface 18a, and irradiates the magnetic recording medium 14 with the NF light. With this, the NF light generator 18 heats a portion of the magnetic recording medium 14 where information is recorded. The NF light generator 18 is formed with Au, Ag, Cu, Al, Pd, Ru, Pt, Rh and Ir or an alloy that consists primarily of these metals. The NF light generator 18 is a roughly-quadrangular prism-shaped metallic strip having a rectangular cross section in the present embodiment. Therefore, although the generator end surface 18 is a rectangle, it may be another shape, such as square, triangle or the like. Out of a bottom surface 18b, an upper surface 18c and two sides 18d extending in the z direction of the NF light generator 18, the bottom surface 18b opposite to the core 12 configures a propagating surface. The propagating surface 18b couples with propagating light 16 that propagates through the core 12 in the surface plasmon mode, and generates surface plasmon SP. The propagating surface 18b propagates the generated surface plasmon SP to the generator end surface 18a of the NF light generator 18, and generates the NF light on the generator end surface 18a.

The laser light generator 15 is positioned at a surface of the opposite side from the ABS S of the magnetic head slider 2. The laser light generator 15 emits laser light toward the waveguide 11 of the magnetic head slider 2 in the z direction, and supplies the laser light to the core 12. The laser light generator 15 is typically an edge emitting type of laser diode, and a laser diode used for communication, for an optical system disk storage or for material analysis can be used. Examples of the laser diode include an InP system, a GaAs system and a GaN system.

The magnetic head slider 2 includes the magnetic recording element 4 for perpendicular magnetic recording. The magnetic recording element 4 has a magnetic circuit 21 for recording information. The magnetic circuit 21 is configured with a main magnetic pole 22, a return shield 23, and a linkage part 24 that physically and magnetically links these. The linkage part 24 links z-direction end parts 22d and 23d of the main magnetic pole 22 and the return shield 23 on the side far from the ABS S, respectively. The magnetic circuit 21 circulates with an open shape roughly parallel to the substrate 3. Two end parts of the magnetic circuit 21 in the circulating direction are formed as end surfaces 22c and 23c parallel to the x-z surface, respectively. The two end surfaces 22c and 23c are opposite to each other in the cross track direction y, and, are close to the NF light generator 18. One end surface 22c configures the main magnetic pole end surface 22c, and the other end surface 23c configures the shield end surface 23c, respectively.

The magnetic circuit 21 is positioned within a second region R2 surrounded by two planes S3 and S4 extending parallel to the integrated surface 3a of the substrate 3. The second region R2 is situated on the upper side in the x direction than the first region R1, i.e., closer to the trailing side than the first region R1, and, is away from the first region R1. Therefore, the magnetic circuit 21 that includes the main magnetic pole 22 and the return shield 23 are positioned on the same side (upper side in the x direction) with respect to the NF light generator 18 in the down track direction x. An overcoat layer 25 made of $Al_2O_3$ is provided on the upper side of the magnetic circuit 21 in the x direction.

The main magnetic pole 22 has a main magnetic pole body part 22a and a recording front end part 22b connected to the main magnetic pole body 22a. A main magnetic pole end surface 22c, which is an end part of the front end part 22b, is positioned in the vicinity of the generator end surface 18a of the NF light generator. A magnetic flux is emitted toward the magnetic recording medium 14 from the main magnetic pole end surface 22c of the recording front end part 22b. The main magnetic pole body part 22a and the recording front end part 22b are formed with an alloy made of any two or three of Ni, Fe and Co. In particular, the recording front end part 22b is preferably made of a material having a high saturation magnetic flux density Bs. The saturation magnetic flux density of the front end part 22b may be higher than the saturation magnetic flux density of the main magnetic pole body part 22a.

In order to enhance the density of the magnetic flux in the down track direction x, the recording front end part 22b is formed to be thinner in the x direction compared with the main magnetic pole body part 22a. In one example, the recording front end part 22b is formed to have 100 nm or less of film thickness by sputtering. Also, recording front end part 22b has a smaller in dimension in the direction z orthogonal to the ABS S than the main magnetic pole body part 22a. In order to emit a magnetic flux with high density from the main magnetic pole end surface 22c, the z-direction width 22h of the recording front end part 22b gradually decreases toward the main magnetic pole end surface 22c from a connection part 22e with the main magnetic pole body part 22a. In the present embodiment, a side surface 22f on the ABS S side of the recording front end part 22b extends in a plane surface form in the y direction, and the side surface 22g on the opposite side extends in a curved surface form. In order to minimize the down track direction offset distance D1 between the recording front end part 22b and the NF light generator 18 as much as possible, an x-direction lower surface 22k of the recording front end part 22b is matched with an x-direction lower surface 22j of the main magnetic pole body part 22a.

The return shield 23 has a shield body part 23a and a shield front end part 23b connected to the shield body part 23a, and has shape that is substantially symmetrical to the main magnetic pole 22. The shield body part 23a and the shield front end part 23b are also formed with an alloy made of any of two or three of Ni, Fe and Co. The shield front end part 23b of the return shield 23 has a shield end surface 23c facing the main magnetic pole end surface 22c of the recording front end part 22b. The shield end surface 23c is positioned in the vicinity of the generator end surface 18a of the NF light generator 18. The return shield 23 absorbs a magnetic flux that returns from the magnetic recording medium 14 at the shield end surface 23c. An x-direction lower end 23e of the shield front end part 23b is substantially matched with an x-direction lower end 22k of the main magnetic pole end surface 22c. Therefore, the offset distance D1 between the recording front end part 22b and the NF light generator 18 in the down track direction x is substantially equal to an offset distance D2 between the shield front end part 23b and the NF light generator 18 in the down track direction x.

The shield front end part 23b is formed to be thinner in the x direction than the shield body 23a. In one example, the shield front end part 23b is formed to have 100 nm or less of film thickness by sputtering. Further, the shield front end part 23b has a smaller dimension 23h in the direction z that is orthogonal to the ABS S than the shield body part 23a.

Due to the configuration above, both the recording front end part 22b and the shield end part 23b have small cross sections, and are arranged to be close to the NF light generator 18. As a result, a flow of a magnetic flux with high density that is emitted from the main magnetic pole end surface 22c and is absorbed at the shield front end 23b is formed. A portion of the magnetic flux goes around the magnetic recording medium 14, and is absorbed at the shield front end part 23b. In the present embodiment, such magnetic flux 14 that goes around the magnetic recording medium 14 is utilized for recording. Therefore, it becomes possible to apply a strong magnetic field to the magnetic recording medium 14 by generating a magnetic flux with high density near the NF light generator 18.

A space 33 between the main magnetic pole 22 and the return shield 23, particularly between the recording front end part 22b (to be more precise, the main magnetic pole end surface 22c) and the shield front end part 23b (to be more precise, the shield end surface 23c) in the cross track direction y is filled with the dielectric body 32 at least partially, and preferably entirely. The dielectric body 32 is made of $SiO_2$, $Al_2O_3$ or the like, and can be formed with the same material as the cladding 13.

A center line 18e extending in the down track direction x of the generator end surface 18a extends between the main magnetic pole end surface 22c and the shield end surface 23c. The generator end surface 18a has a symmetrical shape relative to the x direction, such as rectangle, square, triangle or the like, and the center line 18e is matched with a symmetrical axis. More generally, the center line 18e is a straight line that passes through the center of a FIG. 18g of the generator end surface 18a, and that extends in the x direction. In the present embodiment, the main magnetic pole end surface 22c and the shield end surface 23c have substantially equal offset distances 22q and 23q from the center liner 18e in the cross track direction y.

The distance 26 in the cross track direction y between the main magnetic pole end surface 22c of the recording front end part 22b and the shield end surface 23c of the shield front end part 23b is the same as the width 18f of the NF light generator 18 in the cross track direction y or greater than the width 18f. That is, the NF light generator 18 does not overlap with the main magnetic pole 22a and the return shield 23a in the cross track direction y. In other words, the range occupied by the NF light generator 18 in the cross track direction y does not overlap with the range occupied by the main magnetic pole 22a and the return shield 23a in the cross track direction y. Also, the NF light generator 18 does not overlap with the main magnetic pole 22a and the return shield 23a even in the down track direction x. In other words, the range occupied by the NF light generator 18 in the down track direction x does not overlap with the range occupied by the main magnetic pole 22a and the return shield 23a in the down track direction x. In one embodiment, the NF light generator 18 may overlap with the return shield 23 in the cross track direction y, but at least does not overlap with the main magnetic pole 22. As a result, the NF light generator 18 extends to the ABS S by passing between a projection 32a of the dielectric body 32 in the down track direction x to the substrate 3 and the dielectric body 32. Neither the main magnetic pole 22a nor the return shield 23a exists on the upper side of the NF light generator 18 in the down track direction x (upper side in the lamination direction L); instead, the dielectric body 32 exists.

As shown in FIGS. 2 and 3, the main magnetic pole 22 and the return shield 23 are not situated immediately above the NF light generator 18, but are positioned obliquely upward from the NF light generator 18. Consequently, in the present invention, the distance between the NF light generator 18 and the main magnetic pole 22 or between the NF light generator 18 and the return shield 23 is easily secured, and the transition of a light generated by the NF light generator 18 to the main magnetic pole 22 or the return shield 23 can be effectively suppressed. Heating of the main magnetic pole 22 and the return shield 23 is suppressed so that the possibility of generating thermal damage in the main magnetic pole 22, the return shield 23 and the cladding 13 in the periphery can be decreased.

The magnetic recording element 4 has a coil 28 coiled around the shield body part 23a of the return shield 23. In the figure, the coil 28 is conceptually illustrated, but it is designed such that each part of the coil 28 has a cuboid cross section within which an electric current flows. Magnetic flux is generated in the main magnetic pole 22 by the electric current applied to the coil 28 from the outside. In the present embodiment, the coil 28 is provided around the shield body part 23a, but may be provided around the main magnetic pole 22 or the linkage part 24.

A metal layer 31 that makes contact with the NF light generator 18 is formed between the main magnetic pole 22 and the return shield 23. The metal layer 31 functions as a heat sink of the NF light generator 18. The metal layer 31 extends in the z direction and in a direction away from the ABS S, from a position 31a that is farther from the ABS S than the generator end surface 18a of the NF light generator 18. The metal layer 31 has greater dimensions 31b, 31c and 31d than those of the NF light generator 18 in at least one of the down track direction x, the cross track direction y or the direction x that is perpendicular to the ABS S, but preferably in all directions. The metal layer 31 has a greater volume than the NF light generator 18. In the present embodiment, a portion of the metal layer 31 is situated at least one of the rear sides of the recording front end part 22b or the shield front end part 23b, but preferably at both sides. In conventional thermally assisted magnetic recording head, a metal layer that functions as a heat sink of a NF light generator is sometimes provided, but the size is limited. This is because a main magnetic pole exists immediately above the NF light generator. In the present embodiment, the main magnetic pole 22 is not situated immediately above the NF light generator 18, and a large space is ensured on the rear side of the recording front end 22b and the rear side of the shield front end 23b. Consequently, the large metal layer 31 can be arranged on the upper side of the NF light generator 18. The metal layer 31 absorbs heat that is generated at the NF light generator 18, and prevents heating of the NF light generator 18. Also, since heating of the main magnetic pole 22 and the return shield 23 is mitigated, long-term reliability of the thermally assisted magnetic recording head is improved.

The magnetic recording medium 14 is for perpendicular magnetic recording, and has a multilayer structure where a magnetization orientation layer 14b, a soft magnetic under layer 14c, which functions as a portion of a magnetic flux loop circuit, an intermediate layer 14d, a magnetic recording layer 14e and a protective layer 14f are sequentially laminated on a disk substrate 14a. The magnetic recording layer 14e may be formed with FePt—$SiO_2$.

The magnetization orientation layer 14b stabilizes a magnetic domain structure of the soft magnetic under layer 14c by giving magnetic anisotropy in the cross track direction to the soft magnetic under layer 14c. With this, spike-like noise in the reproduced output waveform is suppressed. The intermediate layer 14d is an under layer of the magnetic recording layer 14e, and controls the orientation of magnetization and particle size.

The magnetic flux emitted from the main magnetic pole end surface 22c is absorbed mainly at the shield end surface 23c, but the magnetic flux partially enters into the magnetic recording medium 14, and sequentially magnetizes each recording bit 14g in the perpendicular direction (z direction) (M1 in the figure). The magnetic flux changes its magnetic path to an in-plane direction (y direction) of the magnetic recording medium 14, and further changes it to the perpendicular direction (z direction) again in the vicinity of a return shield 23, and is absorbed by the return shield 23 (M2 in the figure). The magnetic flux is partially absorbed by the side surface facing the ABS S of the shield body part 23a, as well. Coercive force of a magnetic recording layer 14e can be efficiently reduced by superimposing and applying NF light N to the magnetic flux emitted from the main magnetic pole end surface 22c. As a result, the recording magnetic field intensity in the perpendicular direction (z direction), required for writing, can be drastically reduced. Since magnetization reversal easily occurs by reducing the coercive force, recording can be efficiently conducted with a small recording magnetic field.

In the present invention, since the main magnetic pole 22 and the return shield 23 are on the same side with respect to the NF light generator 18 in the down track direction x, it is possible to arrange the main magnetic pole 22 and the return shield 23 to be close to each other. This is a greatly different point from the conventional thermally assisted magnetic recording head where the main magnetic pole 22 and the return shield 23 are positioned across the NF light generator 18. Consequently, a strong magnetic field can be applied to the recording bits.

In the present embodiment, high magnetic field intensity distribution can be obtained in a wide range along the cross track direction y. However, since the recording width in each bit is determined by width of the NF light generator 18, to be precise, by width of a region(s) where coercive force is lower than the magnetic field intensity due to heating, such magnetic field distribution will not affect bits that are adjacent in the cross track direction y.

Next, a head gimbal assembly (HGA) where the thermally assisted magnetic recording head is mounted is explained.

Figure 5:
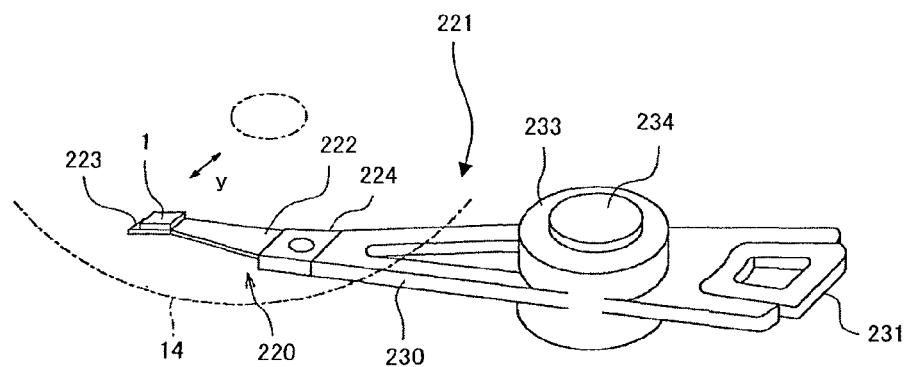
FIG. 5 is a perspective view of a head arm assembly of the present invention.

With reference to FIG. 5, a head gimbal assembly (HGA) 220 includes the thermally assisted magnetic recording head 1 and a suspension 221 that elastically supports the thermally assisted magnetic recording head 1. The suspension 221 has a plate spring-state load beam 22 formed with stainless steel, a flexure 223 provided at one end part of the load beam 222, and a base plate 224 provided at the other end part of the load beam 222. The thermally assisted magnetic recording head 1 is joined to the flexure 223, and provides an appropriate degree of freedom to the thermally assisted magnetic recording head 1. A gimbal part for keeping the position of the thermally assisted magnetic recording head 1 constant is provided at the portion where the thermally assisted magnetic recording head 1 is attached.

The assembly that the HGA 220 is mounted to an arm 230 is referred to as a head arm assembly 221. The arm 230 moves the thermally assisted magnetic recording head 1 in the cross track direction y of the magnetic recording medium 14. One end of the arm 230 is attached to a base plate 224. A coil 231, which is a part of a voice coil motor, is attached to the other end part of the arm 230. A bearing part 233 is provided in the intermediate part of the arm 230. The arm 230 is rotatably supported by a shaft 234 attached to the bearing part 233. The arm 230 and the voice coil motor that drives the arm 230 configure an actuator.

Figure 6:
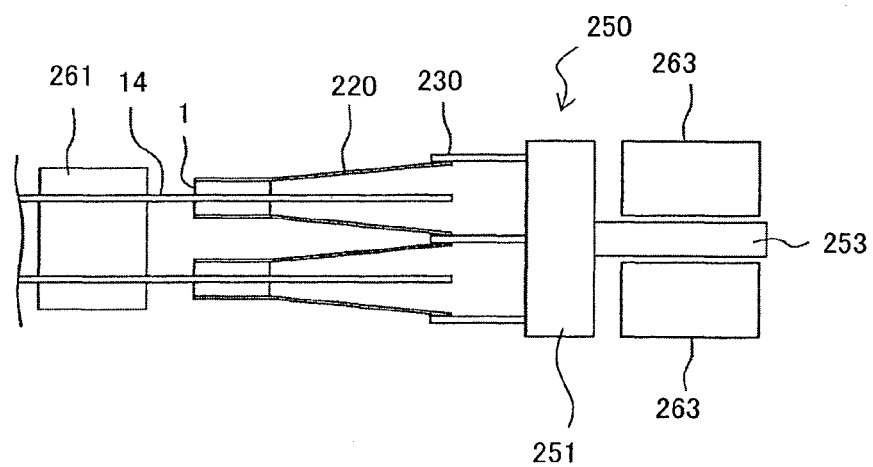
FIG. 6 is a side view of a head stack assembly of the present invention.
Figure 7:
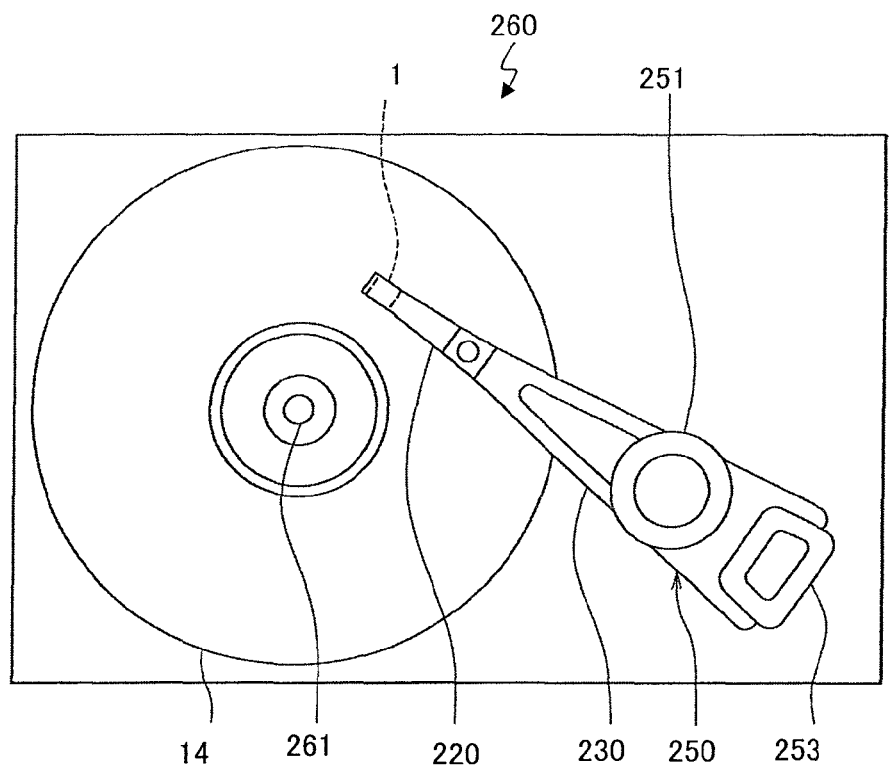
FIG. 7 is a plan view of a magnetic recording device of the present invention.

Next, with reference to FIG. 6 and FIG. 7, a head stack assembly in which the thermally assisted magnetic recording head 1 is incorporated and a magnetic recording device are explained. The head stack assembly is an assembly where the HGA 220 is attached to each arm of a carriage having a plurality of arms. FIG. 6 is a side view of the head stack assembly, and FIG. 7 is a plan view of the magnetic recording device. The head stack assembly 250 has a carriage 251 having a plurality of arms 230. The HGA 220 is attached to each arm 230 so as to be spaced from each other and arranged side-by-side in a perpendicular direction. A coil 253, which is a part of the voice coil motor, is attached to the opposite side of the arm 230 of the carriage 251. The voice coil motor has permanent magnets 263 arranged at opposite positions across the coil 253.

With reference to FIG. 7, the head stack assembly 250 is incorporated into a magnetic recording device 260. The magnetic recording device 260 has a plurality of the magnetic recording media 14 that are attached to a spindle motor 261. Two thermally assisted magnetic recording heads 1 are arranged to be opposite in every magnetic recording medium 14 across the magnetic recording medium 14. The head stack assembly 250 except for the thermally assisted magnetic recording heads 1 and the actuator correspond to a positioning device, support the thermally assisted magnetic recording heads 1, and, position the thermally assisted magnetic recording heads 1 with respect to the magnetic recording medium 14. The thermally assisted magnetic recording heads 1 are moved in the cross track direction of the magnetic recording medium 14 by the actuator, and are positioned with respect to the magnetic recording medium 14. The thermally assisted magnetic recording heads 1 records information into the magnetic recording medium 14 by the magnetic recording element 4, and reproduces the information recorded in the magnetic recording medium 14 by the MR element 5.

Although the desired embodiments of the present invention were presented and explained in detail, as long as they do not depart from the effect or the scope of attached claims, readers should understand that various modifications and amendments are possible.

What is claimed is:

1. A thermally assisted magnetic recording head, comprising:
    a near-field light (NF light) generator that has a generator end surface facing an air bearing surface (ABS), and that generates NF light on the generator end surface and irradiates a magnetic recording medium with the NF light;
    a main magnetic pole that includes a main magnetic pole end surface positioned in the vicinity of the generator end surface, and that emits a magnetic flux to the magnetic recording medium from the main magnetic pole end surface; and
    a return shield that includes a shield end surface positioned in the vicinity of the generator end surface, that is magnetically coupled to the main magnetic pole, and that absorbs the magnetic flux returning from the magnetic recording medium at the shield end surface, wherein
    the main magnetic pole and the return shield are positioned to be on the same side of the NF light generator in a down track direction, and the NF light generator does not overlap with the main magnetic pole either in the down track direction or in a cross track direction.

2. The thermally assisted magnetic recording head according to claim 1, wherein
    the NF light generator does not overlap with the return shield in the down track direction.

3. The thermally assisted magnetic recording head according to claim 1, further comprising:
    a core that can propagate laser light as propagating light, wherein
    the NF light generator extends to the generator end surface while being opposite to a portion of the core, couples with the propagating light that propagates through the core in a surface plasmon mode and generates surface plasmon, propagates the surface plasmon to the generator end surface, and generates the NF light on the generator end surface.

4. The thermally assisted magnetic recording head according to claim 3, further comprising:
a laser light generator that supplies the laser light to the core.

5. The thermally assisted magnetic recording head according to claim 1, wherein
the main magnetic pole has a main magnetic pole body part and a recording front end part connected to the main magnetic pole body part;
the return shield has a shield body part and a shield front end part connected to the shield body part;
the shield front end part includes the main magnetic pole end surface and extends in a cross track direction;
the shield front end includes the shield end surface, and extends in the cross track direction; and
a space between the recording front end part and the shield front end part in the cross track direction is at least partially filled with a dielectric body.

6. The thermally assisted magnetic recording head according to claim 5, wherein
a gap between the recording front end part and the shield front end part in the cross track direction is equal to or greater than the width of the NF light generator in the cross track direction.

7. The thermally assisted magnetic recording head according to claim 5, further comprising a metal layer that contacts the NF light generator between the main magnetic pole and the return shield.

8. The thermally assisted magnetic recording head according to claim 7, wherein
a portion of the metal layer is situated at least either at a rear side of the recording front end part or at a rear side of the shield front end part, viewed from the ABS.

9. The thermally assisted magnetic recording head according to claim 7, wherein
the metal layer extends in a direction away from the ABS from a position farther from the ABS than the generator end surface of the NF light generator, and has a greater dimension in the cross track direction than the NF light generator.

10. The thermally assisted magnetic recording head according to claim 9, wherein
the metal layer has a greater dimension in the down track direction than the NF light generator.

11. The thermally assisted magnetic recording head according to claim 7, wherein
the metal layer is integrally formed with the NF light generator.

12. A head gimbal assembly (HGA), comprising:
the thermally assisted magnetic recording head according to claim 1, and
a suspension that elastically supports the thermally assisted magnetic recording head, wherein
the suspension comprises:
a flexure where the thermally assisted magnetic recording head is joined,
a load beam having one end connected to the flexure, and
a base plate that is connected to the other end of the load beam.

13. A magnetic recording device, comprising:
the thermally assisted magnetic recording head according to claim 1,
the magnetic recording medium positioned to be opposite to the magnetic head slider,
a spindle motor that rotates and drives the magnetic recording medium, and
a device that supports the magnetic head slider and that is positioned with respect to the magnetic recording medium.

14. A thermally assisted magnetic recording head, comprising:
a substrate;
a near-field light (NF light) generator that is positioned inside a first region surrounded by two planes extending parallel to an integrated surface of the substrate, and that generates an NF light and irradiates a magnetic recording medium with the NF light;
a magnetic circuit that is positioned inside a second region, which is surrounded by two planes extending parallel to the integrated surface of the substrate, and which is separated from the first region, that circulates with the open shape as having two end surfaces, and where the two end surfaces are opposite to each other in a cross track direction, and are close to the NF light generator, and where one end surface emits a magnetic flux to the magnetic recording medium and the other end surface absorbs the magnetic flux returning from the magnetic recording medium; and
a dielectric body that at least partially fills the space between the two end surfaces, wherein
the NF light generator extends to an air bearing surface (ABS) via the space between a projection of the dielectric body to the substrate in the down track direction and the dielectric body.

* * * * *